US008006192B1

(12) United States Patent
Reid et al.

(10) Patent No.: US 8,006,192 B1
(45) Date of Patent: Aug. 23, 2011

(54) LAYERED GRAPHICAL USER INTERFACE

(75) Inventors: Glenn Reid, Woodside, CA (US);
Priscilla Shih, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 09/679,692

(22) Filed: Oct. 4, 2000

(51) Int. Cl.
 *G06F 3/00* (2006.01)
(52) U.S. Cl. ........ 715/762; 715/760; 715/763; 715/765; 715/788; 715/768; 715/793
(58) Field of Classification Search .................. 345/700, 345/760, 762, 763, 765, 788, 522, 768, 793
See application file for complete search history.

(56) References Cited

U.S. PATENT DOCUMENTS

| | | | | |
|---|---|---|---|---|
| 5,335,320 A * | 8/1994 | Iwata et al. .................. 717/110 |
| 5,900,877 A * | 5/1999 | Weiss et al. .................. 345/803 |
| 6,104,391 A * | 8/2000 | Johnston, Jr. et al. ........ 345/745 |
| 6,121,963 A * | 9/2000 | Ange ............................ 715/202 |
| 6,275,226 B1 * | 8/2001 | Uchida et al. ................. 715/744 |
| 6,307,574 B1 * | 10/2001 | Ashe et al. .................... 345/765 |
| 6,353,450 B1 * | 3/2002 | DeLeeuw ...................... 715/768 |
| RE37,722 E * | 5/2002 | Burnard et al. .................... 713/1 |
| 6,404,433 B1 * | 6/2002 | Ruff et al. ...................... 345/441 |
| 6,411,312 B1 * | 6/2002 | Sheppard ...................... 715/769 |
| 6,628,303 B1 * | 9/2003 | Foreman et al. ............. 715/723 |
| 7,009,626 B2 | 3/2006 | Anwar |
| 7,032,176 B2 * | 4/2006 | Gordon et al. ................ 715/719 |
| 7,124,366 B2 * | 10/2006 | Foreman et al. ............. 715/719 |
| 7,194,686 B1 * | 3/2007 | Suzuki et al. ................. 715/716 |
| 7,272,815 B1 * | 9/2007 | Eldridge et al. ............. 717/101 |
| 7,346,850 B2 | 3/2008 | Swartz et al. |
| 2003/0009537 A1 * | 1/2003 | Wang ............................ 709/219 |
| 2006/0059253 A1 * | 3/2006 | Goodman et al. ............ 709/223 |

* cited by examiner

*Primary Examiner* — Weilun Lo
*Assistant Examiner* — Mylinh Tran
(74) *Attorney, Agent, or Firm* — Blakely, Sokoloff, Taylor & Zafman LLP

(57) ABSTRACT

A method of creating a graphical user interface having control(s) to direct any task through a computer system is provided. One application of the user interface is for manipulating a time based stream of information to create a presentation. The methods use a layered graphic file that is accessed by an application program to generate the user interface. Each layer of the graphic file contains a control object to an element of the user interface. The control objects are capable of being revised in order to make alterations to the user interface. Other aspects of the present invention relating to the graphical user interface are also described.

39 Claims, 10 Drawing Sheets

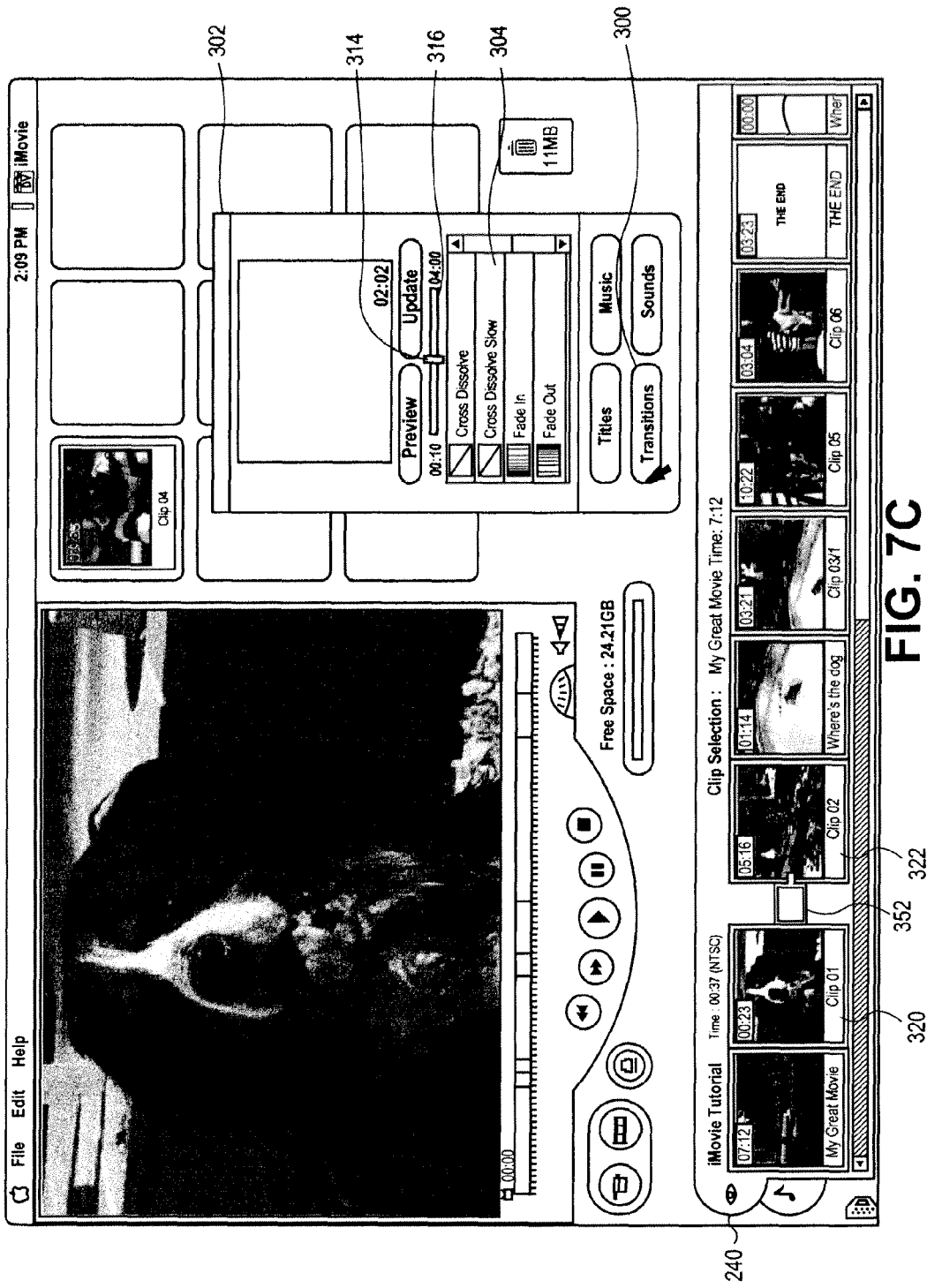

LAYERED GRAPHICAL USER INTERFACE

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods of providing a user interface for directing task(s) using a processing system, and more particularly to methods of creating a graphical user interface having user control(s) through a layered graphic file.

BACKGROUND

Graphical user interfaces (GUIs) provide a picturesque display of computer output and controls for a user to direct various operations of software. GUIs allow for endless possibilities of creating a user-friendly environment in which to view and interact with computer systems.

It is usually important for a user interface to have a look and feel that is comfortable for the user. For many application programs, e.g. word processors, database programs, Web browsers, development tools, editing programs, communication programs, etc., it is desirable for the user interface to be designed with a control panel that it provides for ease of use. For example, in editing applications simple GUIs are especially significant.

Some editing applications involve the manipulation of time based streams of information by novice users to create presentations. These time-based streams of information may be in the form of full motion images, e.g. video and movies; audio, e.g. music, sound effects, and voice/narration; motion graphics, e.g. animation; still images, e.g. text, pictures; and combinations thereof. The information is usually comprised of a stream of individual units, e.g. frames or blocks. Frequently, this information is in a digital format and resides on any of a number of conventional electronic mediums.

Some prior editing systems include Studio DV from Pinnacle Systems Inc. of Santa Clara, Calif.; Avid Cinema® from Avid Technology, Inc. of Tewksbury, Mass.; Adobe Premier® from Adobe of San Jose, Calif.; Dazzle* Digital Video Creator™ from Dazzle Multimedia of Fremont, Calif.; and DVgate™ from Sony Corporation of Tokyo, Japan.

Digital editing is typically performed in an editing processing system and involves random retrieval of information from storage, communication of the information, e.g. display on a monitor, and then manipulation of the information to produce the desired presentation. The presentation often appears as a seamless flow of the edited information.

Traditionally, editing of multimedia to produce presentations involved complex techniques performed by trained professionals. However, recently novice users have become interested in making presentations, as well. The processing of multimedia to produce sophisticated home movies, web sites, business presentations, marketing demonstrations, amateur movies, etc. has been gaining in popularity.

Given the currently diverse level of skills among authors of presentations, it is desirable to provide processing systems that are easy and convenient to operate. Such systems should have simple user interface displays from which a user may work.

In general, a user may direct software operations by employing tools, referred to as "control elements," e.g. buttons, menus, windows, text, etc, that are provided by a computer system. Typically, at least some of the control elements are displayed on the user interface. Control elements may be active in instructing the software to execute operations, such as output information, or may be passive to simply display useful information on the screen, such as windows showing stored data. Several attributes of control elements presented on the display, such as the control elements' presentation, behavior, function, etc., influence the overall convenience of the GUI.

Applications for the GUI often vary among users and in certain uses control elements may be more important than other controls. For example, different GUI's may be used to generate presentations for business talks, home movies, academic lectures, etc. However, most prior systems have fixed user interfaces that waste precious screen real estate on control elements that are less important for a particular application. It would be useful, then, for a processing system to provide a user interface that may be redesigned to emphasize only the desired control elements and to show them in a preferred manner. Designers of the GUI should be permitted to easily change the characteristics of the control elements.

Previously, GUI's have been created by first drawing the look of an image, e.g. the control element, with a graphic file and then converting the drawn picture into an intermediary format containing details regarding the image. The intermediate format is used to add various aspects of a control element, such its function, behavior, location, and/or the like. Such an intermediate format is any resource or file that is complementary to the application or built into the application that is required to fully describe a control element on a GUI. The intermediate format is picked up by an application program and depicted on a display. Since the user interface is a representation of the intermediary format, the user interface may not be altered through the graphic file without reconverting the entire file to the intermediary format. Thus, a control element may not be altered without recompiling the complete GUI.

Whenever any component of the GUI is changed, a designer of the user interface must patiently wait while for the entire interface to be reconverted. As a result, much time is wasted while the designer remains idle. The lack of immediate feedback is inconvenient, especially when multiple attempts are made at editing before the desired modifications are achieved. However, with these previous processing systems, the designer may not inspect even the most minor changes to determine if the edits are acceptable until after the intermediate format step is complete and then accessed by the application. By comparison, it would be beneficial for a system to permit the designer to immediately view any alterations made to the interface. Quick feedback of revisions speeds up the editing of the GUI and simplifies revisions.

Another drawback with these previous methods is that some of the details of the GUI may become lost in the conversion of the graphics drawing into the intermediary format. By contrast, elimination of the intermediate format step reduces the risk of lost details. Furthermore, by avoiding the intermediate format step, there is one less process that may provide bugs in the production of a GUI.

In light of the shortcomings of the various currently available systems, there is still a need for a quick and simple method of creating a GUI in a manner. In particular, there is an interest in a processing system that allows a designer to easily edit the display of control elements on a GUI.

SUMMARY OF THE INVENTION

In one embodiment of the present invention, a method for producing a graphical user interface having at least one control element for use in controlling software operations is provided. The method includes storing a graphic file that has at least one control object each organized in a separate layer. An application program to display a control element on the graphical user interface and access the graphic file is launched. The control element that is shown on the user interface has at least one attribute that is dictated by one of the control objects. This control element may be an edit control for manipulating a time based stream of information.

In one aspect of the method the graphic file has a control object dictating one attribute of the control element and located in one layer as well as another control object in a separate layer dictating another attribute of the same control element. These control elements may share the same common route name and the layers may optionally be grouped together.

The graphic file is often editable so that a customized user interface may be produced by adding, deleting or changing the control objects within the layers. The entire GUI need not be converted to an intermediate format for each modification. Thus, the revised GUI may be immediately displayed. At times, this manipulation does not effect other portions of the graphic file unless the layer is grouped with another layer. Some of the attributes that are defined by the control objects include appearance, location or size of the element on the user interface. The control objects may also dictate the element type, state, function or behavior in a particular environment.

In order to generate the GUI, a processing system may be employed which has a processor for storing the graphic file that has the control object(s) in a separate layer(s), and for launching the application program that accesses the graphic file and displays the control element on the graphical user interface. In another embodiment of the processing system, there includes a means for storing the graphic file and launching the application program. A means for altering the attribute by a single control object may also be provided.

According to still further embodiments, a computer readable medium may be provided that has stored therein a plurality of sequences of instructions, which, when executed by a processing system, cause the processor to perform a variety of processes to related to producing the GUI with at least one control element. The instructions command the processor to store the graphic file and execute the application program. In some cases, the control element is an edit control to manipulate a time-based stream of information. Of course, other embodiments may provide only the instructions themselves or methods of performing these steps.

Other features and advantages of these and other embodiments are discussed in detail below.

BRIEF DESCRIPTION OF THE DRAWINGS

The present invention is illustrated by way of example, and not limitation, in the figures of the accompanying drawings in which:

FIG. 3A-3C illustrates examples of various areas of storage, wherein FIG. 3A shows one embodiment of an information storage area having clips of time based streams of information, FIG. 3B shows one embodiment of a reference storage area and FIG. 3C depicts one presentation storage area during generating of a presentation.

FIGS. 7A-7C are examples of user interfaces for use in editing, according to one embodiment of the present invention, wherein FIG. 7A is a GUI showing a reference icon, FIG. 7B is a GUI showing controls for editing text into a presentation and FIG. 7C is a GUI showing controls for editing transitions into a presentation.

DETAILED DESCRIPTION

The methods described below are employed by a processing system to produce a layered graphical user interface with at least one control element defined by stored control objects. The control objects for each control element are stored in separate layers in a graphic file. The user interface is displayed by launching an application program that accesses the graphic file. The control objects are capable of controlling at least one attribute of a control element shown by the application program. The layered user interface, according to the present invention, permits a GUI designer to configure the control elements of the user interface to create a customized look and feel.

In one embodiment, the processing system is an authoring tool to provide editing of a time based stream of information to generate a presentation. Through the graphical user interface, the editing processing system permits a user to easily control the editing process and select the information to be included in the presentation. The time based stream of information and related presentation created by use of the editing processing system may be of any form, such as full motion images with audio, full images without audio, audio only, still images, motion graphics or any combination thereof.

Hardware Overview

Figure 1:
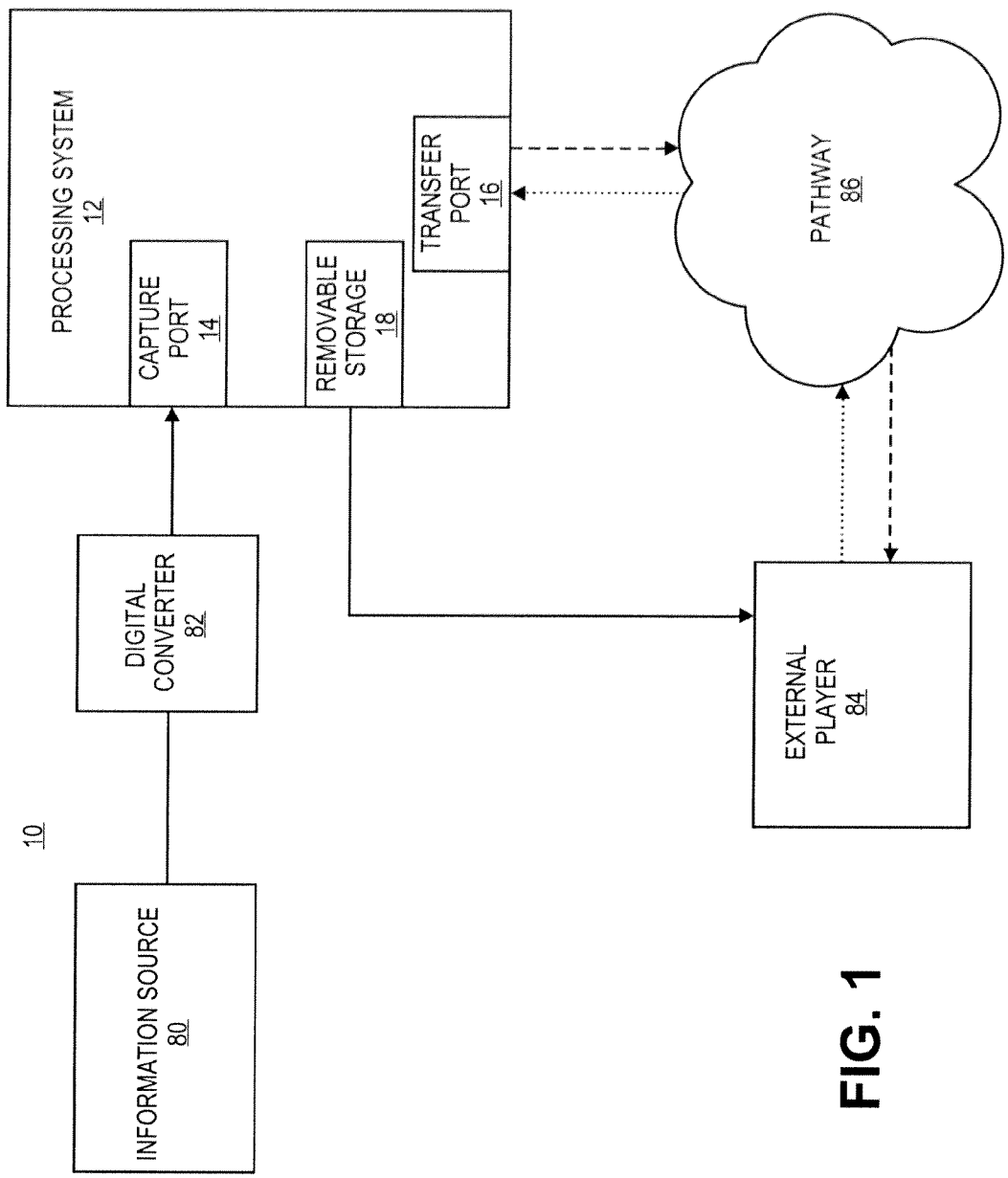
FIG. 1 illustrates one embodiment of a working environment in which information may be processed, in accordance with the teachings presented herein.

A processing system may be employed in a variety of contexts where a graphical user interface permits a user to dictate various tasks performed by the processing system. FIG. 1 illustrates one exemplary working environment 10 in which a graphical user interface may facilitate a user to control software operations to process information, e.g. processing of a time based stream of information to produce a presentation. A processing system 12, according to one embodiment of the present invention, is in communication with an information source 80 that has information, at a capture port 14 (i.e. information collection interface) and optionally through an intermediate digital converter 82. Processing system 12 may read, copy, manipulate, store, delete, output, print and/or transfer information provided by source 80. An optional external player 84 receives communication from processing system 12, indirectly from a transfer port 16 and through pathway 86, and/or directly through a removable storage medium 18. Although FIG. 1 demonstrates one layout of working environment 10, the scope of the present invention anticipates any number of information sources and players, coupled and arranged in various fashions and configured in accordance herewith. Furthermore, the system for using a graphical user interface may be utilized without an information source, digital converter and/or external player.

The information source 80 is any type of device that generates and transfers data or data signals related to the information. The information source 80 may be a photographic or full motion image capture interface such as a camera, camcorder, digital camera, etc.; a sound capture interface, such as a laser disc player (e.g. CD player), tape player/recorder, MP3 player, microphone, etc.; a keyboard; a scanner; a computer; a server; a computer program; the Internet, a sensor; any one of numerous available data collection devices; etc.

Figure 2:
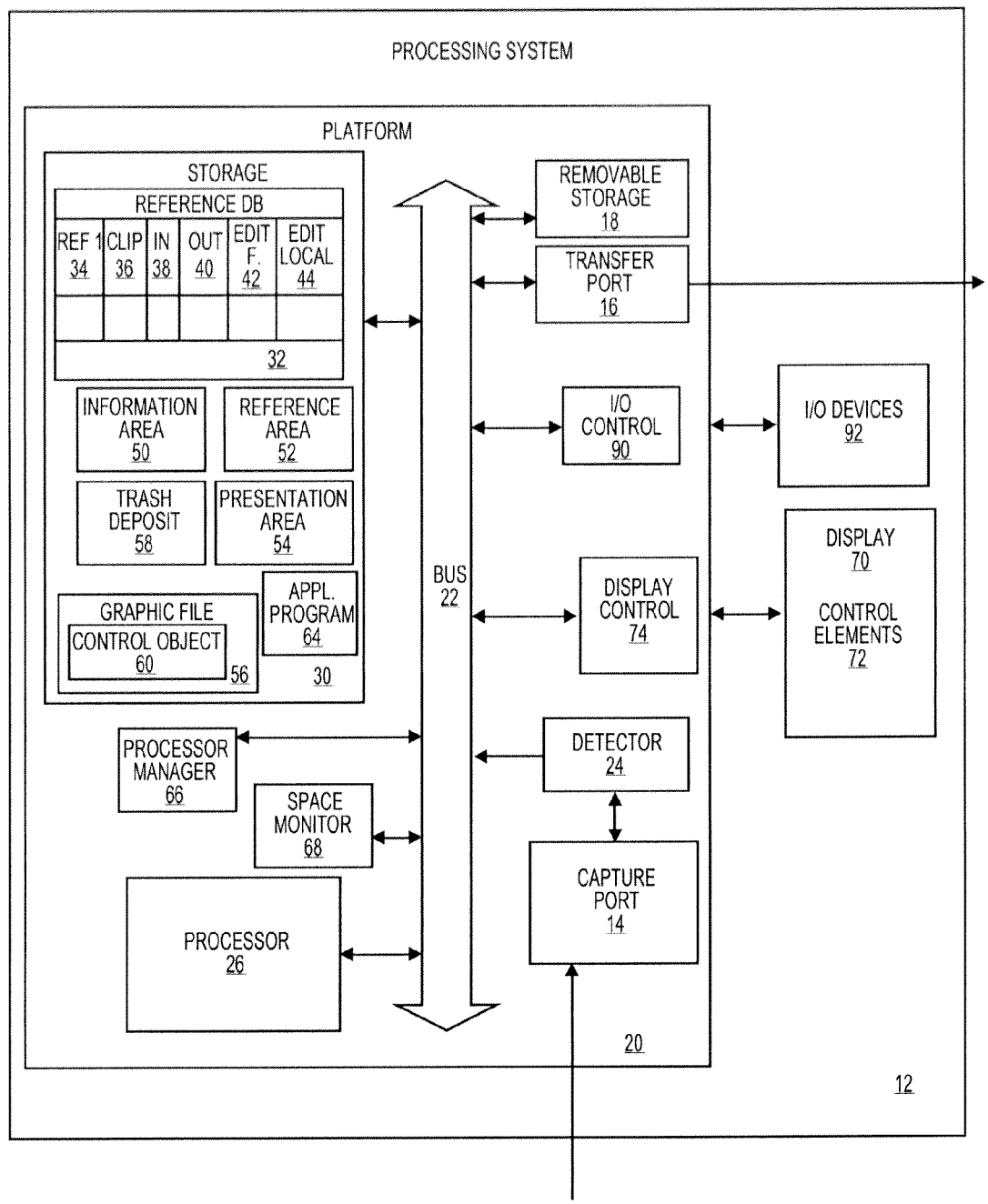
FIG. 2 is a block diagram of one embodiment of a processing system, configured in accordance with the teachings presented herein.

The information source may generate digital data signals and be communicatively coupled directly to the processing system 12. Alternatively, the information source may generate signals in a format other than digital, e.g. analog signals. As shown in FIG. 2, such non-digital data source may send signals to a digital converter 82 for changing the signals into a digital format prior to transfer of the data to the processing system 12. In another configuration, the information source 80 resides in the system, such as a software file having data that is imported to an application program employed by the present invention.

Communication between the information source 80 and the processing system 12 is often through means of a FireWire® (from Apple Computer, Inc. of Cupertino, Calif.), iLink or IEEE 1394 communication protocol. Where a FireWire brand protocol is employed, capture port 14 in the processing system may be a six-pin FireWire brand port. Also, a corresponding four-pin FireWire brand port may be present on the digital converter 82, where a digital converter is included, and/or on the information source 80. In this case, a six-pin-to-four-pin cable may be used to connect the ports of the digital converter 82 or information source 80 and processing system 12.

Other communication schemes are also suitable for transfer of data from information source 80 and/or digital converter 82 to the processing system 12, such as an Ethernet connection (i.e., capture port 14 may be an Ethernet port), serial interfaces, parallel interfaces, RS422 and/or RS432 interfaces, Livewire interfaces, Appletalk busses, small computer system interfaces (SCSI), ATM busses and/or networks, token ring and/or other local area networks, universal serial buses (USB), PCI buses and wireless (.e.g., infrared) connections, Internet connections, and other communication links for conveying the time based stream of information from an information source 80 to the processing system 12. In addition, source 80 may store the information on a removable storage source, which is coupled to, e.g. inserted into, the processing system 12 and in communication with the capture port 14. For example, the source 80 may be a tape, CD, hard drive, disc or other removable storage medium.

The processing system 12 is any device configured to receive the information and manipulate the information, for example to generate a presentation The processing system 12 may be a computer system, workstation, and the like. In one embodiment, the processing system 12 includes a platform 20, e.g. a personal computer (PC), such as a Macintosh® (from Apple Computer, Inc. of Cupertino, Calif.), Windows®-based PC (from Microsoft Corporation of Redmond, Wash.), or one of a wide variety of hardware platforms that runs the UNIX operating system or other operating systems. Often, the processing system 12 is configured to send the resulting information to an external player 84.

The external player 84 may be an IP host, a computer, a personal digital assistance (PDA), a server, a tape/CD/MP3 player, or other device that is configured to receive the information from processing system 12 and to display the information. In one instance of a working environment, the external player 84 is the same device as the information source 80, such as a camcorder. In still another case, no external player is provided and the information is played on the processing system and/or projected from the processing system onto a medium, e.g. a screen.

The external player 84 may receive information directly through removable storage 18 from the processing system 12. Removable storage 18 represents any of a number of detachable storage mediums, e.g. magnetic, optical, magneto-optical, tape, and/or other type of machine-readable medium or device for storing information. For example, the removable storage 18 may be a hard disk, a read-only or writeable optical CD (e.g. CD ROM, DVD), a disc, tape, etc.

External player 84 may also receive presentation information indirectly from the processing system 12, such as through a pathway 86. The communication pathway 86 may be through various networking mechanisms, such as a FireWire brand connection (iLink or IEEE 1394 connection), LAN, WAN, telephone line, serial line Internet protocol (SLIP), point-to-point protocol (PPP), an XDSL link, a satellite or other wireless link, a cable modem, ATM network connection, an ISDN line, a DSL line, Ethernet, or other communication link between the processing system and external player.

The processing system has components for handling information in various ways. The processing system 12 in FIG. 2 includes an optional capture port 14 for acquiring the information, a storage 30 for holding information and control tools, a processor 26 for manipulating the information and performing other operations, an optional process manager 66 for instructing the processor on editing and storage of information, a display 70 for showing a user interface and possibly a transfer port 16 or removable storage 18 for sending the information so processed. Upon review of this specification, it will be appreciated by those skilled in the art that the components of processing system 12 may be connected in various ways in addition to those described herein.

Furthermore, although FIG. 2 shows these components in the context of an editing processing system for generating a presentation of a time based stream of information, it should be recognized that the processing system described below is only one example of a system that may use the GUI produced by the methods presented herein. The description of a processing system herein is not intended to limit the scope of the present invention to such a processing system and its components. Thus, the present invention anticipates the production and use of the GUI in a variety of other systems where a graphic file is directly accessed to generate the GUI with its various control elements. Other systems may employ the GUI of the present invention for controlling any software application, such as a word processor, database program, Web browser, development tool, editing program, communication program, and the like.

Where an editing processing system is used with the GUI, at least one time based stream of information is assembled into a presentation. For example, a video may be edited and combined with audio, text, effects and/or graphics to create a presentation. A "presentation" is any changed version of an original time-based stream of information or a modified copy of the original information. In addition, a "presentation" also may further be defined by at least one instruction for representing the original information in a changed form. In such an instruction-based presentation, the information is communicated in the manner according to the instruction. For instance, a software program may include directions on how a digital video should be played, where only certain frames of a video are chosen for display.

A portion or portions of sequential information, also referred to as a "clip," such as a continuum of segments, frame, block or footage, may be rearranged into a desired order. Editing may further entail removing portions of clips. During editing, particular "edit features" may be added to the presentation, such as transitions between clips, special effects (e.g., black and white, brightness, contrast, texture, echoes, compositing, blurring, etc.), text, graphics, black background, silent audio segments, combinations of different types of time-based streams of information, such as audio and still images, and the like. Various types of editing may be performed as new techniques for altering raw information are created.

In general, editing processing systems require that the time based stream of information be captured from a media source and entered into the system. The information, as well as the newly created presentation, is stored within memory of the system. Typically, the presentation is in the form of references that correspond to the stored information. The references have instructions on handling the information. These editing processing systems permit the user to control what is included in the presentation by moving the in and out points in the references to indicate the segments of information that are to be accessed. Thus, a presentation may include instructions regarding the portion of the information in which output is to begin and the portion of the information where the output is to cease. For example, the references may direct the select portions of the information that are to be included in the presentation. The references also may include edit features to be added to the presentation. Through a user interface presented on a display, reference elements that represent the references in storage are manipulated. In these instruction-based editing processing systems a user's edit choices are embodied by the references.

Now referring in more detail to the components shown in FIG. 2, processing system 12 includes processor 26, which may represent one or more processors. Some exemplary processors are a Motorola Power PC processor, an Intel Pentium (or x86) processor, etc. The processor 26 may also be a microprocessor. The processor 26 runs an operating system and applications software that controls the operation of other system components. The processor may be configured to perform multitasking of several processes at the same time. The processor may perform the operations required to produce the GUI, such as storing a graphic file having at least one control object and launching an application program to access the graphic file.

Storage 30 is coupled to processor 26 by a bus 22. The storage 30 may be a dynamic random access memory (DRAM) and/or may include static RAM (SRAM). Typically the storage is a hard disk drive, but may alternatively be another magnetic disk, a magneto-optical disk or other read/write device. The processor may also be coupled to other types of alternative storage areas that may be considered as part of the storage 30 or separate from the storage 30. Such alternative storage areas may include cache, flash memory, etc., and which may also be considered the removable storage 18. Usually storage 30 has a capacity in the megabyte to gigabyte range, and more typically, at least 64 megabytes capacity and can sustain throughput of at least 7 megabytes per second of information. However, as technology advances, the capacity of the storage may increase.

Figure 3A:
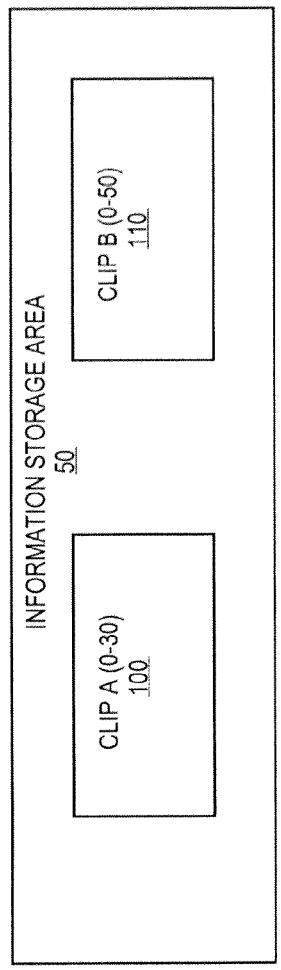

The storage 30, as used in a processing system, may contain information within files as well as executable code that may provide functionality for processing the information. For example, a time based stream of information may be stored within files in an information storage area 50. One exemplary information storage area 50 is depicted in FIG. 3A as having a segment of a time based stream of information, clip A 100 with units (0 to 50), and another fragment, clip B 110 having units (0 to 30).

A storage in an editing processing system also may have at least one and usually multiple references to the stored information. The reference includes data, e.g. instructions, on how the processor is to read and/or manipulate the stored information. Typically, a reference is an object that corresponds to an individual clip of information. The reference data include at least one in-point that specifies where the processor is to start accessing the stream of information and at least one out-point that identifies where to stop access of the information.

The reference data may also contain instructions on adding particular edit features to a presentation that are in addition to the stored information and location data on where such edit features are to be presented in the time based stream of information. Some edit features are text, transitions, graphics, special effects (e.g. black and white, brightness, contrast, texture, echoes, compositing, blurring, etc.), black background, silent audio segments, overlays, three-dimensional images, audio, etc. In one configuration, edit features are provided by a plug-in or Active-X control and made available to an editing application program used herein. The edit features available for use with the present invention may be changed and new edit features added to the system. Edit features are any modifications that may be made to the units of the original time based stream of information for use in the presentation, that exist with current editing technology or may be created in the future.

Figure 3B:
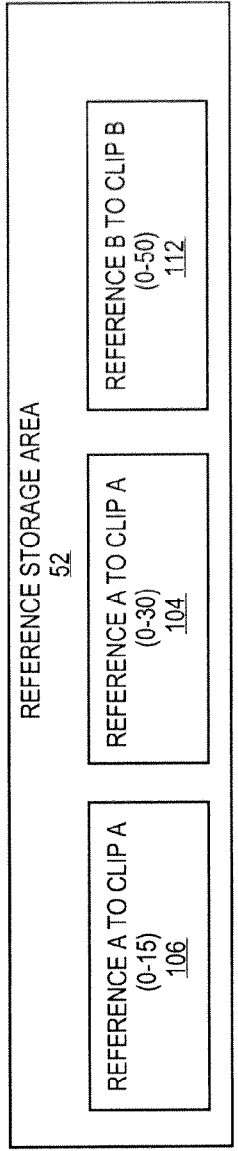

The references to the stored information may reside in a reference storage area 52. One embodiment of reference storage areas 52 representing edited references based on the information is shown in FIG. 3B, where reference storage area 52 corresponds to the information of FIG. 3A with modified reference A1 (0 to 15) 106 corresponding to clip A, but only from units (0 to 15) 100, a copy reference A2 (0 to 50) 104 and reference B (0 to 30) 112 corresponding to clip B units (0 to 30) 110.

The stored references may be indexed in a reference database 32 within the storage 30. Each entry 34 in the database is to a reference and provides various data found within the reference, such as the associated clip 36, an in-point 38 and an out-point 40. For example, a reference (1) may indicate clip (A) with an in-point at frame (0) and out-point at frame (60). The database may also include other reference data that assists in generating a presentation.

Figure 3C:
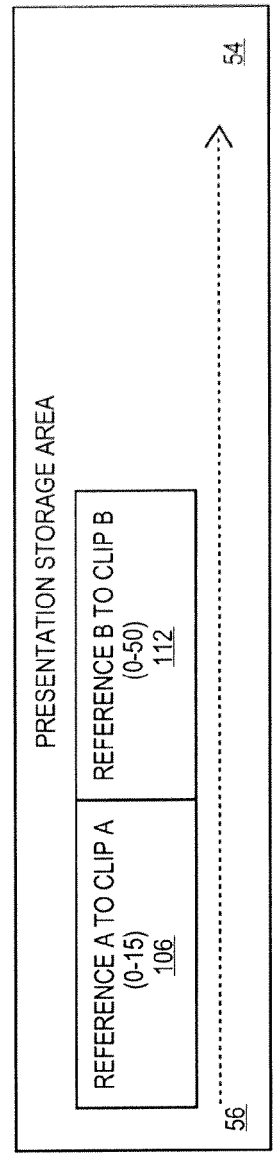

The presentation that is generated by an editing processing system, as represented by the references, may be stored in presentation storage area 54. The presentation storage area includes data related to when the information is to be displayed along a presentation time line 56. One presentation storage area 54 that draws upon the pool of reference data from FIG. 3B is shown in FIG. 3C and begin with reference A1 (0 to 15) 106 corresponding to clip A units (0 to 15) 100 and immediately followed by reference B 112 corresponding to clip B units (0 to 30) 110.

The storage 30 also has data that is used to project the graphical user interface. A graphic file 56 is stored with at least one control object 60 having instructions for the control elements, that are displayed on the user interface. The graphic file 56 may be produced by any multiple layered-type computer program for creating and manipulating graphic images on a computer, where separate layers have control object(s), e.g. Adobe Photoshop®, by Adobe Systems Incorporated, located in San Jose, Calif.; and Paint Shop Pro™, by Jasc Software, Inc., located in Eden Prairie, Minn.

The control object 60 in the graphic file 56 dictates the attribute(s) for visible control elements, i.e. images, displayed on a user interface for creating the presentation through the use of references. Active control elements may be used to control any software task and passive control elements may be used to output information or data. In an editing processing system, for example, least one control element is an edit control to allow a user to manipulate a time based stream of information and design a presentation or otherwise control it. One control object may define one or several attributes for a given control element and different types of control objects may be in pages within the graphic file.

Figure 4:
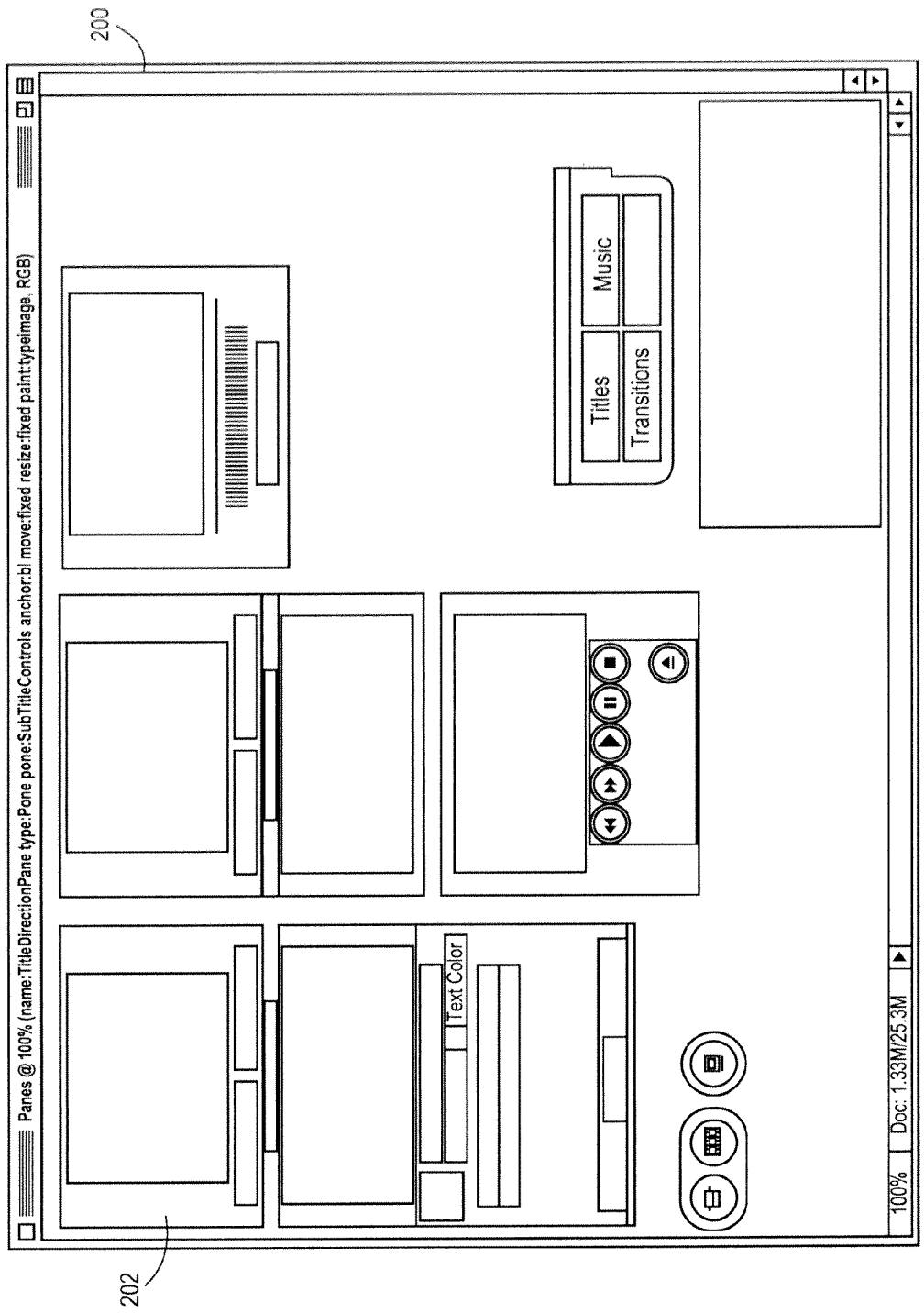
FIG. 4 is an illustration of an image page having control objects in a graphic file, in accordance with the teachings presented herein.

Some of the control objects determine attributes that are related to the bits or pictures drawn from each layer in the graphic file to the user interface. Such attributes include the appearance of the control element, such as color, shape and text (font, size and/or wording). Other attributes may be the location of the element on the user interface and the size of the element. These picture-related control objects may be embodied in an image page 200 in the graphic file 56 as shown in FIG. 4. The control objects 202 depict each control element as they would substantially appear on the user interface. Thus, the graphic file, through control objects stored in separate layers, contains the attributes required to display the entire GUI and there is no need to convert the images from a graphic file to an intermediate format.

In order to change, add or delete an attribute, a control object 202 is selected from or added to the image page 200 and the particular attribute reconfigured using commands as set forth by the graphic file program, e.g. through menu selection. For example, to relocate a control element on the user interface, the corresponding control object may be selected, dragged to new position and dropped into place, e.g. by use of a mouse. Similarly, to change the size of a control element, the associated control object may be selected and expanded or reduced, e.g. via cursor movement or menu selection. In addition, to change the text appearing on a control element, the control object may be again selected and the text retyped, e.g. via keyboard input.

Figure 5:
FIG. 5 is an illustration of a list page having control objects in individual layers in a graphic file, in accordance with the teachings presented herein.

Other attributes of control elements are behavior-related to determine the function that the control element represents. The control objects that correspond to control element behavior may be recorded in a layer list page 204 in the graphic file 56. One such layer list page 204 is shown in FIG. 5. The page has multiple layers 208 of control objects 206 describing some typical behavior-related attributes, where usually each entry represents a single layer having a control object. One attribute typically defined in a layer list page is the name 210 of the control element, e.g. Play Full Screen, Title Color, Transition Popup Pane, Trash Can, etc. A control object 206 also may describe the type 212 of the corresponding control element, such as button, slider, static text, table pane, pop-up tab pane, etc. In addition, the state 214 of the element may be identified by a control object, especially where the associated control element has multiple states. Some such state attributes include pressed, up, down, disable, uproll, etc. Several states may be defined for a particular control element by separate control objects for each state, where individual control objects for the same control element are located in separate layers, share a common root name and specify the characteristics of the element for each of the different states. For example, Play Full Screen may be a name for a control element assigned to several control objects for particular states of the Play Full Screen control element. Further to this example, a control object may dictate that when the Play Full Screen element is in the "up" state, the full screen view of a selection is played. The command or function 216 of the element is another common attribute identified by a control object. Examples of functions include playing the full screen, preview the title, etc. In addition, the behavior 218 of the element may be defined for a particular environment, such as the behavior in different resolutions in which the application program may be executed. A control object may describe the location of a control element at 800×600 resolution and the location at 1024×768. For example, a layer named "TitlePopupPane" may have a description, "anchor:br move:fixed resize:fixed" to specify that the TitlePopupPane is anchored to the bottom right corner of its parent pane, so if the parent pane is resized, the TitlePopupPane remains the same distance from the bottom right corner of the parent pane, as specified by the graphic file. Other objects may describe an element as "sticking" to a corner or side of a window; resize horizontally, vertically or in both directions; or stay centered. The attributes may also include any other feature that describes a given control element, some of which attributes may be specific to a particular control element. In addition to the methods described herein, the attributes may also be defined by various other means of drawing control objects to individual layers, as established by the particular graphic file employed.

In order to alter the control elements (attribute) represented by control objects on the layer list page 204, the control object in a layer is reconfigured. The control object in a particular layer is selected and the description of the attribute of interest is changed, e.g. retyped via keyboard input or menu selection. For convenience, control objects in multiple layers may optionally be grouped together so that all objects of a particular group may be described as acting in the same manner or changes to one member of a group will be automatically transferred to the other group members. In addition, members of a group may be further subdivided into subgroups. Another type of connection is a link among layers through link control 220. Linked layers may be placed in the same general location in the graphic file and attributes changes made to any single layer are applied to all associated links.

Typically, each control object is contained in an individual layer in the graphic file. The layers permit the user interface to be worked on as if it was on a series of transparent overlays. Each control element of the user interface may be treated as an independent entity. Thus, any control element may be selected and changed without affecting the other control elements. A control element may have one or many associated control objects related to different states or aspect of the control element, e.g. 1 to 100 layers may relate to a single control element. The order in which the layers are listed in the graphic file determines the order in which the control elements are written in the user interface. Usually, the interface is drawn by first retrieving the bottom layer and then proceeding to the top layer and the top of the list appears on the user interface in front of the layers at the bottom.

According to the present invention, the graphic file is accessed directly by an application program 64, e.g. video editing software. The application program 64 retrieves the drawn layer data to display the components of the user interface. The graphic file is thereby opened in its native file format. The graphic file may be maintained by an operating system as a file that is separate from the application program. By this direct access configuration, a GUI designer may easily change any aspect of the user interface at any time by altering the graphic file and redrawing individual layers contained therein.

Figure 6:
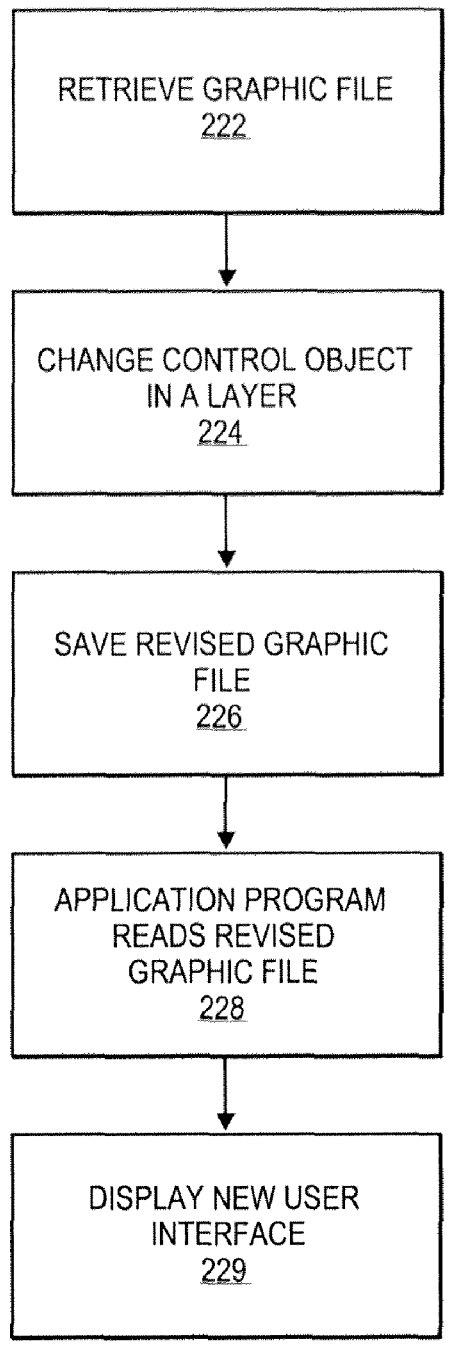
FIG. 6 illustrates a flow chart depicting one method for changing a user interface for editing according to the present invention.

As shown by the flow chart in FIG. 6, in order to change an attribute of a control element on the user interface, the corresponding control object in a particular layer in the graphic file is retrieved 222. The description of the attribute in the isolated control object is changed as desired 224 and saved 226, usually without affecting the control objects in any other layer unless the particular layer is grouped (or subgrouped) with or linked to other layers. The application program reads the revised graphic file 228 and immediately depicts the new user interface 229 for viewing by the user.

Active control elements, such as those displayed on the GUI, may be activated by the user through input/output device 92. In order to input commands and output responses, the processor 24 of the system for example the processing system 12 shown in FIG. 2, is coupled by bus 22 to an input/output (I/O) control 90. The I/O control 90 commands one or multiple I/O device(s) 92. Some conventional I/O devices are key boards, mouses/trackballs or other pointing devices, microphones, speakers, magnetic disk drives, optical disk drives, printers, scanners, digital cameras, etc. There are a variety of interactive mechanisms to activate the control elements, such as keyboard input, voice command, mouse manipulation, text entry, pen-to-text data entry device, touch screen, network signals, satellite transmissions, preprogrammed triggers within the system, instructional input from other applications, etc.

The control elements respond to activation by sending instructions to the processor. For example, a processing control element conveys directions to the processor regarding how a clip is to be treated or displayed. Each control element includes properties that describe how it will react when selected by the user or other means.

The processing system may contain any number of different types of control elements. All of the control elements described herein are by way of example and are not intended to limit the choices that are or may become available in the art.

Some forms of control elements that are visible on the screen are buttons, "pop-up" or pull-down menus, scroll bars, panes and iconic images. Other control elements may be invisible to the screen and thus are not included on the GUI. Control elements that are not visible on the screen may be present on input/output devices, such as a keyboard that is in communication with the I/O control. For example, a space bar on a keyboard may also be depressed to start capture and depressed again to stop capture of the information on the fly while playing the time based information during capture mode.

The table shown below describes other control elements that may be present on the keyboard of a processing system for manipulating a time-based stream of information. The items in the "action" column describe the command activated by depressing the keyboard button and the items in the "shortcut" column are the corresponding keyboard buttons.

| Keyboard shortcuts | |
|---|---|
| Action | Shortcut |
| Navigation | |
| Play/Stop and Start/Stop Capture | Space Bar |
| Play-head to Beginning of Movie | Home |
| Play-head to End of Movie | End |
| Forward One Frame | Right Arrow |
| Forward Ten Frames | Shift + Right Arrow |
| Roll Play-head Forward | Hold Down Right Arrow |
| Search Forward (fforward) | Command + ] |
| Back One Frame | Left Arrow |
| Back Ten Frames | Shift + Left Arrow |
| Roll Play-head Backward | Hold Down Left Arrow |
| Search Backward (rewind) | Command + [ |
| Selection | |
| Multiple Selection | Shift + Click Item |
| Multiple Selection (range) | Click 1st item then Shift + Click last item |
| Moving/Cropping | |
| Move Audio Clip | Click Clip + Left or Right Arrow |
| Move Audio Clip Ten Frames | Click Clip, then Shift + Left or Right Arrow |
| Move Crop Marker | Click Marker + Left or Right Arrow |
| Move Crop Marker Ten Frames | Click Marker, then Shift + Left or Right Arrow |
| Accept/Cancel | |
| Accept Dialogs (OK) | Return |
| Cancel Dialogs | Esc or Command + C |
| Cancel Rendering | Command + . (period) |
| Volume | |
| Increase System Volume | Up Arrow |
| Decrease System Volume | Down Arrow |
| Titling | |
| Move Between Text Fields | Tab |
| File Menu Functions | |
| New Project | Command + N |
| Open Project | Command + O |
| Save Project | Command + S |
| Export Movie | Command + E |
| Save Frame As | Command + F |
| Import File | Command + I |
| Quit | Command + Q |
| Edit Menu Functions | |
| Undo | Command + Z |
| Redo | Shift + Command + Z |
| Cut | Command + X |
| Copy | Command + C |
| Paste | Command + V |
| Crop | Command + K |
| Split Clip at Play-head | Command + T |
| Select All | Command + A |
| Select None | Command + D |
| Help Menu Functions | |
| Imovie Help | Command + ? or Help key |

To show the visible control elements, as shown in FIG. 2, a display control 74, e.g. video board, is coupled to the processor 26 through bus 22. The display control 74 communicates with the display 70 in the processing system 12 to couple the display 70 to the platform 20. Display 70 may be any one of a number of conventional display devices such as a liquid crystal display, cathode ray tube, plasma display, video display, or other type of display device. For sharp colors and grayscale, display 70 may be an SVGA monitor, with a resolution of 800×600 (26 dpi) or better, with an active area of at least 15 inches, and may be controlled using a true color video card. The visible control elements as well as other editing data may be depicted on a graphical user interface (GUI) that is shown on a display.

The GUI used in generating a presentation may have numerous innovations that allow a user to easily make edits and create a presentation. An exemplary GUI 230 for displaying various data related to both the capture of time based streams of information and processing of the information is depicted variously in FIGS. 6A to 6C. The present invention frequently has a single GUI to display enabled, i.e. operable, capture information and enabled, i.e. operable, process information. Such a GUI is functional for both capture and edit procedures, thus avoiding the necessity of switching to multiple GUI's to view and work with information relating to capture and information relating to the processing of the presentation. Any convenient portions of the screen may be used to show the capture and process information without the user needing to toggle between screens.

As shown in FIG. 6A, the process information displayed on the GUI 230 may include at least one reference element 236, e.g. icon, with each reference element 236 being associated with a reference in storage that has data for a clip of the time based information contained in storage 30. Typically, the reference element 236 is displayed as a "thumbnail" in the form of a still image of the first frame of the associated clip. Where the reference has an edit feature, a description or depiction of the edit feature may also be included on the reference element, such as a portrayal of the edit feature 350, or a particular shape, size or texture to indicate the edit feature. For example, a reference to a transition may be in the form of a box 352.

Typically, control elements in the form of one or more windows are present in the GUI, which may be opened by processor 26 or by the user. One such user interface for use with an editing processing system illustrated in FIG. 7A has several windows, such as a monitor window 246, time line 240 and edit box 268. The monitor window 246 may be the viewing portion of the display that shows the edit output. Various other windows may be present on the display of the processing system to provide at least one control element.

At any time during the edit process, the system may produce an edit output to reveal stored clips of the time based information for processing/editing e.g. the clip associated with a reference element may be viewed on the monitor window 246. The edit output may depict how the clips would appear in presentation after editing is complete. To view the information, a reference element may be selected and drug/dropped or cut/pasted onto the monitor window. However, such these actions do not necessarily result in the reference element being removed from its current place on the GUI, but simply allow the information to appear on the monitor window.

Similarly, the GUI in an editing processing system may also be used to depict or play the time based stream of information (referred to as a "capture output"), as well as other characteristics of the information that is being acquired. The capture output sets forth the current frames that are being received and read, such as newly acquired information that is present in a proxy, i.e. buffer, prior to being written into storage. During the capture mode, the monitor window 246 may exhibit the capture output of the time based information. By the dual use of the monitor window 246 for both edit output and capture output, the screen area is conserved and the user interface is simplified.

A monitor window time ruler 260 depicts where the play-head 262 as it travels along the course of the clip. A variety of output controls 248 may be used to move the play-head to various positions on the clip. When the play-head is at the frame of interest, the pause control 258 may be activated and the frame edited. In this manner, the user may select particular portions of information and instruct the system to edit the selected portion, e.g. deleting the selected portion from storage.

One set of control elements are output controls 248 that implement how the user chooses to view or listen to the information from the system. Output control elements may direct the showing of the information on the monitor window 246, the playing of information through audio speakers, or output through other convenient devices in communication with the system. There are several types of output controls 248 that may be provided by the processing system.

The output controls 248 may be used to move the play-head (i.e. pointer to indicate the location in the information available for use) to particular sections of the information stored in the storage. One such output control is a play control 250 that directs the system to play or show the information. Other kinds of output controls include a rewind control 252 and a forward control 254. The play-head may be jogged backward by the user depressing the rewind control 252 to shuttle the play-head in a reverse direction. The output of information is advanced by the user selecting the forward control 254 during playback to shift forward at faster than the normal play rate, e.g. double the speed. Also provided by the processing system may be a stop control 256 for ceasing the output action and a pause control 258 for temporarily suspending the movement of the information from the system. In practice, the stop control 256 may be selected and then the rewind control 252 or forward control 254 selected to quickly skip forward or backwards through the footage.

In one method of outputting the time based information through the use of output controls, the play control 250 is activated and then the rewind control 252 or forward control 254 chosen to move to a position that is a immediately prior to the appropriate position for capture. The stop control 256 is selected and the play control 250 is reactivated. When the scene of interest is displayed or a particular portion of audio is played, the clip may be edited.

Several additional output controls may also be employed for alternative ways of communicating the information. For example, a full screen mode control 252 may be provided to permit the presentation to be shown in a window that spans the entire area of the display. Also, some control elements may adjust the quality of playback. A preferences option with a playback tab (not shown), and an edit pull down menu 254 are some optional quality controls. In addition, a sound control knob 256 functions to adjust the intensity of audio.

A smooth motion control may be present to allow the user to create a smoother playback than would be typically expected. Usually, the bandwidth necessary to display digital video requires that visual quality be compromised in order to deliver a high number of frames per second (fps) during playback. Also, a better image control may be included to provide a crisper playback and more detail from each frame displayed. Such option for a better image is often at the expense of motion quality. The number of frames per second that may be displayed is dependent on the processing power of the system, where higher power results in higher frame rate and playback that is less choppy.

Further to the GUI used in an editing processing system, a time code 237 may also be provided to indicate the length of a clip. In addition, a space monitor element 234 may show the amount of storage space remaining or amount of space consumed by stored information.

Still other control elements may receive reference elements in order to manipulate the references in forming segments of a presentation. The user may input commands to select and relocate reference elements 236 or portion(s) thereof, to the several windows and portions on the GUI, such as a shelf 238, a video time line 240, an audio time line 242 or other portion of the display. One typical way for a user to select a reference element is by pointing a cursor on the reference element and clicking on it, such as via a mouse or keyboard stroke. However, a user may use other tools for selection such as menu choices, voice instructions, etc. A selected reference may be indicated on the GUI by a highlighted border 354 around the reference.

In one embodiment, a reference element is moved to various portions of the display by moving a pointer 356, e.g. cursor, over the reference element and dragging the reference element to another portion of the display. The reference element is dropped over the intended spot on the GUI by releasing the pointer from the reference element.

Another means to move a reference element is though a cut and paste command. The reference element is selected and is made to disappear from the screen by activating a cut command. Activation of the cut command may occur by the user choosing a menu option, keyboard stroke, etc. An intended place for the relocation is selected and a paste command activated to prompt the reference element to reappear in the selected place.

In addition, other functionalities may be provided by the processing system to relocate the reference element on the GUI, such as mouse clicks, keyboard commands, menu options, various types of control elements, etc.

The reference to each clip that is to be included in the presentation is usually positioned in the presentation by arranging the reference element(s) along a time line 240, 242 in the order that the associated information will appear in the presentation. The graphical representation of a visual time line 240 is for adding visual information, such as the time based stream of information in the form of full motion images, e.g. video and movies, motion graphics, e.g. animation, as well as still images, e.g. text, pictures, combinations thereof, and the like. The graphical representation of an audio time line 242 is for including audio information, such as music, sound effects, and voice/narration, etc. to the presentation. A user may opt for the audio synch time line to automatically display the references for each incoming stream of information. For example, the user may choose a preference control from a menu and select to have the references appear in the audio synch time line rather than the shelf portion of the user interface. The data corresponding to the time lines is stored in presentation storage area within the system.

Often, the processing system includes functionality to display and use only a single visual time line 240 which is capable of handling any type of edit feature and other visual information. The visual time line may include visual reference elements with any combination of the edit features to be included in the presentation. Where it is desired for an edit feature it be nested in another reference (i.e. clip), the reference element may be split into two reference elements and the reference element having the edit feature is positioned between the two on the time line. A time code 237 may be provided that indicates the length of a clip associated with the reference. Furthermore, the time line may include the total time 358 of the presentation. The time line also may have a scroll bar 360 to move up and down the length of the time line, so that the time line is not limited by the space provided by the display.

Edit features may be conveniently added to a presentation by use of an edit box 268 that includes various editing control options, such as titles control 270, transitions control 300, music control 330 and sound control 350. Specific sub-windows having edit controls may be included for the various edit features contained in the edit box. In one embodiment, a sub-window pops-up on the GUI by activating an edit control option, e.g. by a mouse click. The sub-windows may also be retrieved by selecting an existing reference that has an edit feature. Upon selecting such as reference, the sub-window to the reference's edit feature automatically appears on the screen for use in further editing. These pop-up windows save screen space and create an easy editing environment for the user.

Title control 270 includes instructions for adding text, such as headings, labels or captions to a clip. Selection of the title control 270 opens a title window 274 as shown in one embodiment in FIG. 6B. A transition time ruler 276 may be provided to show the length of the selected clip and the position of the play-head 278. The user may navigate the play-head to various frames in the clip by positioning a cursor over the play-head through use of a mouse, or using other cursor positioning means. The mouse may be used by clicking and holding down on it and sliding the mouse to the left or right along the title time-line relative to the desired location of the play-head.

The title window 274 frequently also includes one or more text field(s) 280 for describing the desired text. A position menu 282 permits the user to choose where and how the text is to appear on the frame. For example, the text may be a centered title, appear to bounce through the length of the frame, centered with multiple text lines, centered as a title, letters flying across the frame, words flying, music video, rolling center credits, rolling credits, scroll with a pause, scrolling as a block, typewriter, and the like. A font menu 288 may be used to dictate the character type. An "over black" control 284 may be used to insert an additional black frame at the play-head position and the title over the black frame. An example of a reference element with text over black 285, having the title, "THE END" is shown on time line 240. On the other hand, a "color" control 286 may be used to overlay the text over the current frame. The text may be shown in a preview window 290 by selecting a preview control 292. Preview simulates the edited reference without the edited version being actually saved in storage. An add control 294 may be provided for storing the reference with the title. The reference with edit feature 296 may then be shown on the monitor window 246. The initial clip 01 may be split into the reference with edit feature 296 and remaining portion reference 298, as shown on video time line 240.

A transition control 300 has instructions for inserting an effect between clips, where selection of the transition control 300 opens a transition window 302, as depicted in FIG. 6C. A transition effects menu 304 permits the user to choose from any one of numerous transition options. Examples of transitions are cross dissolve, cross dissolve slow, fade in, fade out, overlap, push right, slowly push right, scale down, slowly scale down, and the like. The frame location of the play-head 314 along transition time ruler 316 may be positioned by the same or similar manner as described above for introducing titles in a clip. The transition is typically inserted as a frame immediately after the play-head position by reference element with transition 352 and then appears on visual time line 240.

Furthermore, the exemplary edit box 268 shown in FIG. 6A includes music control 330 for incorporating music tracks to the presentation where the music may be recorded by controls in the music control window. Sound control 350 in the edit box 268 is for including sound effect to portions of the presentation. Usually, the sound effects are prerecorded and stored within the processing system. Some examples of sounds are cat meow, dog bark, crickets, crowd applause, trumpets fanfare, wild laugh, water lapping, whistle, thunder, horn honk and footsteps.

The various tasks that control the edit and storage of information and reference data are usually performed by a process manager. A process manager 66 is shown in FIG. 2 coupled to storage 30 and processor 26 through bus 22. During the capturing of information, process manager 66 may allocate space on the storage for keeping a new information file. During the edit process, the user may make use of the tools described above in a variety of ways to form the desired presentation.

The process manager receives selection commands, such as from a user input or software instructions, and responds by selecting the appropriate information and/or reference data, which may be an entire file of information/data or portions thereof. Typically, references are selected, viewed, optionally modified with edit features and transferred to a position on the time line, such as by drag/drop or cut/paste mechanisms. For example, a reference may be selected from the monitor window of an edit sub-window and either cut and pasted into the time line or drug from the monitor window and dropped into the time line. At any time, particular references may be removed from the presentation and returned to the shelf, also through the drag and drop or cut and paste tools. Where a reference is removed, the references remaining in the presentation shift over in the time line to create a seamless continuation of the presentation.

There are numerous editing tasks that are performed by the process manager, some of which are described in the examples below. The exemplary editing methods so described may also be applied to adding any type of editing features to the presentation, such as text, transitions, audio, graphics, etc.

(1) Cut and Paste Editing Example

For one method of cutting or copying a portion of a clip during the processing of a presentation a first reference is initially provided, such as reference A1 corresponding to clip A (0 to 50). Next, the processing manager copies the reference A1 to create a duplicate reference A2 (0 to 50). The process manager changes the reference data of either the original or copied reference to reflect edit command requests where the in point and out point of reference A2 are modified to (0 to 20). The process manager places modified reference A2 onto a paste board for inserting into a presentation. The reference data that is present in the paste board may be inserted at any point in the presentation along the time line in presentation storage area. If the reference is to be placed prior to or after another reference, already present in the presentation storage area, or if there are no other references provided in the presentation storage area, the reference is simply pasted into the storage area. On the other hand, where the reference is to be nested within another reference, third reference B1 (0 to 30), the reference B1 (0 to 30) is first split at the point where insertion is to occur (unit 15) by copying the reference B1 (0 to 30) to create reference B2 (0 to 30). The in and out points are changed so that the reference B1 (0 to 15) corresponds to the first clip portion prior to the inserted reference A2 and the reference B2 (16 to 30) corresponds to the second clip portion following reference A2. The modified reference A is then pasted between the two reference B's in the presentation storage area.

In subsequent steps, the cut and paste process may be undone to retrieve the original data. For example, reference A2 may be deleted in response to a deletion command and reference A1 is preserved. The continuum time line between reference B1 and B2 is also restored such that there is no gap where reference A2 had previously been positioned. Although referenced B1 and B2 may remain split, the two references run seamlessly to appear as though there is a single reference to the clip.

(2) Adding Edit Features Example

In one method of adding edit features to a clip during the processing of a presentation, a reference A1 corresponding to clip A (0 to 50) is provided. The reference A1 is copied to create a duplicate reference A2 (0 to 50). Usually, selected edit features may be added to either the beginning (first frame) or ending portions (last frame) of the clip represented by the original or the copy reference. Where the edit feature is intended for the beginning or ending unit(s) of a reference, the feature is simply inserted in the reference and the reference having the edit feature is placed in the presentation storage area. Movement of the reference may be through the cut and paste methods described above or by a user command to drag and drop the reference in place.

In the alternative, text may be intended for a middle portion of a clip. The reference A2 (0 to 50), that is targeted for text editing is split at the location (between unit 25 and 26) for the text by copying to the reference and forming reference A2(a) (0 to 50), and reference A2(b) (0 to 50). The in and out points of the references are modified to reflect the split to reference A2(a) (0 to 25) and reference A2(b) (26 to 50). The text may be added to the beginning unit(s) or ending unit(s) of the split reference 152 and the edited reference added to the presentation storage area 154. The text may be added to the last unit of reference A2(a) at 25 and may additionally be included in any sequential units previous to 26 without skipping any units in the timeline. It is also possible to add the text to reference A2(b) starting at unit 26, and to any sequentially following units without skipping any such units.

In addition, where a user does not need a segment of information for the presentation, a clip or portion of a clip may be removed from storage. Entire clips or portions of clips may be deleted by selecting the reference data and dragging it to the trash icon control 370 on the GUI. After depositing the reference data in the trash, the user may activate a delete control. For example, the user may select an "empty trash" e.g. from a pull down menu. In still other embodiments, the user may activate a "cut" command, e.g. from a pull down menu, to have the selected data placed on a paste board. The user may then send delete instructions to the processing system and the data as well as corresponding information is deleted. In another embodiment, an intermediary trash bin or paste board is not used and the user simply elects to delete selected reference data. Other methods for the user to send selection, deletion and trash commands are also possible and intended by the present invention.

Where the system receives such trash and/or delete command from a user input or software instruction or other means, the process manager 44 may respond by deleting the relevant information and references thereof. Furthermore, where the selected data is cut and placed onto a paste board, the process manager may respond to a delete command by deleting the data from the paste board and as well as its associated information.

An optional trash depository 58 may be provided in storage 30, as shown in FIG. 2, to temporarily hold references, reference data, the time based stream of information, or any portions thereof. The contents of the trash depository may be accessed, manipulated, or removed by the processing system. Often, the trash depository 58 serves as a holding bin for unwanted data prior to its deletion from storage. By dropping the data into the trash depository, the user may continue with uninterrupted editing and later empty the trash, i.e., delete the contents and any associated information, at a convenient time. At any time while the reference data is in the trash depository, the processing system may receive a cancel command, such as from the user or other means. In the case of a cancel command, the process manager returns the reference data back to its original location and restores the initial reference, e.g. in and out points, rather than deleting the reference and the information.

The process manager may perform such delete action by directly and permanently eliminating the selected information (and associated reference data) from storage. This direct elimination may take place by the process manager copying over the relevant file. If there is any information occurring prior to or after the eliminated section, the remaining information appears to be continuous and uninterrupted by the copy over the excluded section. In the alternative, the deletion may also take place by changing a virtual file allocation table (VFAT, FAT or FAT32) to indicate that the space that has been used by that file is available for reuse by another file. When new files are written to that space, the deleted data is overwritten and thus, permanently eliminated. Prior to this overwriting, it may be possible for the deletion to be reversible.

In one embodiment, direct elimination of information occurs where the beginning portion or middle portion of a clip in a file is selected for deletion. This elimination may occur by various mechanisms. In one embodiment, the system may copy the portion that is to be preserved into a new file and the old file may be removed. In another instance, the system may simply shift over the preserved data to replace the eliminated data. For example, where units 0-30 are to be eliminated from a clip of 0-40, units 31 to 40 may be moved into the space previously occupied by 0-30, thus creating a clip 0-9. In this manner the header information that may be present in the beginning of a clip may also be preserved.

Where a tail end of a clip in a file is to be deleted, the clip may be merely truncated such that the ending portion is marked as extra space that is available for reuse. Thus, the beginning header information is still present in the file. Furthermore, in order to erase all of a file that is selected for elimination, the deletion may take place by merely marking the entire file as deleted and available for reuse as described above.

In any case, the process manager may also be triggered to perform several relevant routines upon receipt of the delete command. In one embodiment, a reference check method is performed when the system receives a selected information command and a delete command. The process manager responds to the delete command by checking in the reference database to determine if a single or no reference data to the selected information exists. Where the process manager concludes that more than one reference data set to the selected information exists, the process manager fails to eliminate the selected information from storage. Rather than deleting the information from storage, only the selected reference data is deleted. On the other hand, if the process manager establishes that more than one reference data set to the selected information does not exist, the process manager deletes the selected reference data contained within a reference or portion of a reference, if any are such data present in the storage, and also deletes the selected information from storage.

The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

At times, an edited version of the time based stream of information may be produced by the system and stored. The time based stream of information that corresponds to an edited reference is copied into storage. Then, either the original or copy of the information is modified to reflect the edited reference. Thus, the storage includes both the original time based stream of information and edited version of the information.

The total amount of storage space available for new files is determined by a space monitor 68. Space monitor 68 is coupled to storage 30 through bus 22. When a new file is created to hold information, the space monitor ascertains the amount of space that is utilized by the new file and subtracts this consumed space to recalculate the remaining amount of space in storage.

In one configuration of processing system 12, a means for communicating with an information source that has a time based stream of information is provided. For example, bus 22 additionally couples detector 24 to the processor 26. The processing system may detect a connection between the processing system and the information source through detector 24. The detector 24 performs an inquiry as to whether an information source is in communication with the processing system. The detector determines a connection with the information source by sensing particular signals, such as electrical current output, that are released from the information source, and usually when the source is energized, i.e. "turned-on." The detector may be further configured to conduct periodic checks for communication with the information source.

Means are provided for capturing the time based stream of information from the information source, such as a capture card or other capture mechanisms. The transfer rate of the information entering the system is usually the same or substantially the same speed that the information runs prior to entering the system, such as the rates established by the video standards of various regions. For example, movie film usually runs with a speed of 24 fps. Some video follows the NTSC (system used in North America and Japan), where the video speed is 30 fps.

The information may be captured and written into storage by various mechanisms. One capture mechanism is a sequential-type method in which an application procedure is executed when the processing system is in capture mode. In one stage of the application procedure, signals from an information source are captured. The system reads the information, shows the information on the display and writes the information to a storage medium. However, when control elements are activated, the system moves away from the capture step and switches to another stage that includes a process control commands loop for handling the control instructions. The CPU of a system employing such a sequential-type method is dedicated to processing the control commands. While application procedure is in the process control command loop, the capturing operation ceases and the processing system stops communicating with the information source. During this period, the information that is released from the information source does not get loaded into the system. Rather, the processing of control commands continues through to completion, at which time, the capturing step may continue.

Another capture mechanism, according to the present invention, is a low-level interrupt-type method, which effectively permits intermittent processing of control element commands while, at the same time, loading the time-based information. With the interrupt-type method, in addition to the capture application, a user may run any software applications, e.g. network communication protocols, such as Appletalk, Internet or e-mail applications, word processing applications, etc.

An interrupt-type method includes an application procedure that may be executed when the processing system is in capture mode and when it is not in capture mode, e.g. when the system is in edit mode. Where the processing system is operating in a non-capture mode, the application procedure conducts normal operations, such as processing of control commands from control elements. However, when the capture mode is indicated, the interrupt procedure fires the appropriate capture tasks and causes a temporary suspension of the application procedure in an asynchronous manner. Thus, the processing of control commands proceeds until the capture process interrupts the other application tasks.

This interrupt procedure may be performed at periodic intervals and are certain to iterate at regular times, despite the activities, e.g. processing of control commands, of the application procedure. The interrupt procedure includes a quick reading of incoming information, copying the information into a proxy, outputting the information and writing it into storage where the information may be further edited by use of the control elements. The interrupt procedure is advantageous in that the process is very quickly performed and rapidly repeats. The time for performance is less than the transfer rate of the information entering the system.

The repetitions of the interrupt procedure occur at a rate that is substantially similar to or the same as the transfer rate. Thus, all of the information may be read and stored while still processing control commands in-between each of the iterations of the interrupt procedure. As a result, the user does not recognize the interruptions and the capture process as well as other instructions appear to be simultaneously executed by the system. Moreover, the interrupt procedure guarantees that information is not omitted from the reading step because the iterations of the interrupt procedure and length of time to perform are timed to correspond with the rate of information transfer from the information source.

For transfer of NTSC video, the interrupt procedure iterations are typically at least every 1/29 to 1/30 second and more usually 1/29.97 second to 1/30 second. For PAL systems (systems used in parts of Europe, China and Hong Kong), the frame rate is 25 fps and thus interrupt procedure is substantially at least every 1/25 second. In general, the interrupt procedure should iterate close to the transfer rate or slightly faster than the transfer rate, e.g. within at least 1/10th second of the transfer rate and more typically within 1/100th second. The iterations should not be slower than the transfer rate and the iterations are usually at the rate that corresponds to the frame rate of video standard.

Usually, the processing system according to the present invention, outputs the information, e.g. depicts the information on the display at a rate (the "output rate") that is substantially similar to the rate in which each unit of the information, e.g. frame of video, is arriving from the information source (the "transfer rate"). In contrast with prior systems, where low quality displaying (i.e. considerably lower than the transfer rate, such as 30 to 70% of the transfer rate) is used to devote more of the system to capture, the present invention may use high quality (i.e. the same or substantially similar to the transfer rate, such as greater than 70% and more usually 93 to 100% of the transfer rate) because all of the information is certain to be stored by the interrupt procedure. The speed at which the information is displayed depends on numerous factors, such as side operations being simultaneously performed by the system, e.g. network access and CD ROM detection, image quality, e.g. based on decompression schemes employed, and processor speed or graphic acceleration. For example, where the transfer rate is about 30 frames per second (fps), the corresponding output rate of the present invention is usually 29 to 30 fps. The transfer rate depends on the particular transfer rate standard employed, as described in detail below. The resulting capture output is of high quality that is similar to the quality of the information residing in the information source.

During the capture process, the time based stream of information is written into storage to be referenced while creating the presentation. For convenience, the stored information may be compressed to conserve storage space. Generally, compression formats are either high efficiency or low efficiency and either loss-less or lossy. Lossy compression schemes are characterized by components of an original image being absent from a reconstructed image after a compression-decompression cycle, whereas loss-less schemes do not drop any information.

Low compression schemes (i.e., those that do not provide significant compression ratios) that may be used include joint photographic experts group (JPEG) compression schemes that use Fourier analysis-based methods, such as the discrete cosine transform, to compress data; graphics interchange format (GIF) compression schemes, which use LZW algorithms; bitmapped image compression schemes and tagged image file format (TIFF) compression schemes, etc. Alternatively, high efficiency compression schemes, such as wavelet, motion wavelet, Motion Picture Experts Group (MPEG) motion JPEG, Lempel Ziv and/or fractal compression schemes, etc., may be employed. Use of high efficiency schemes may be preferred where storage space is limited. For example, wavelet compression schemes may be 20 times more efficient than JPEG compression schemes, providing for a more detailed representation of the data at the same bit budget. Once the time based information is captured and stored, it may be referenced for editing and generating a presentation.

Figure 7A:
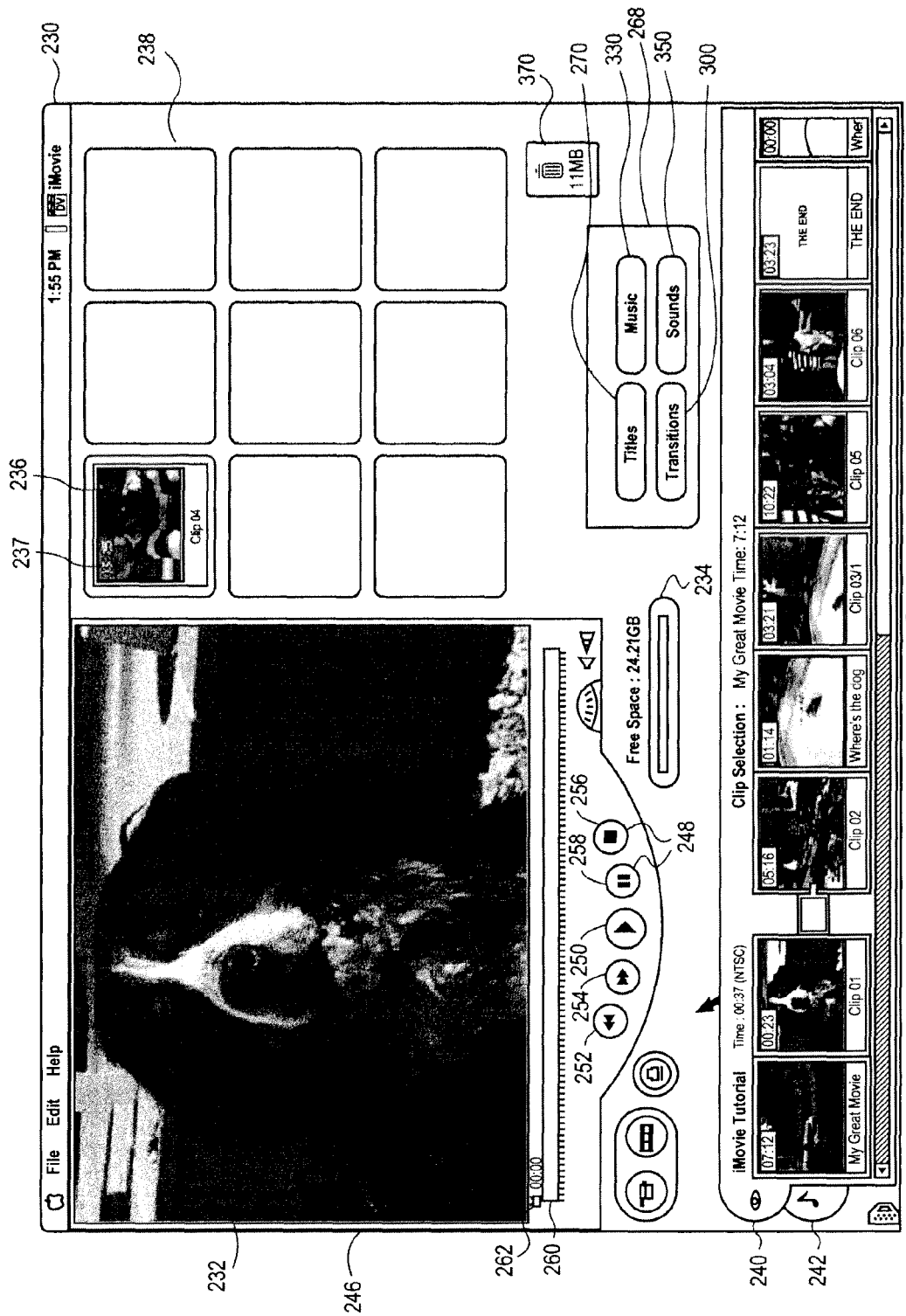

In addition to the features described above, the processing system may further include alternative aspects that enhance ease and convenience of use. For example, referring again to FIG. 2, the information source 80 may be controlled through the processing system 12. Source controls operate the information source 80, usually where no digital converter 82 is employed as an intermediate between the information source and processing system. The source controls may be presented on the GUI. In one embodiment, the output controls 248, as shown in FIG. 7A also serve as the source controls to direct the monitor window views at one time and send action commands to the information source 80 at another time. Thus, the source controls may include rewind control 252, forward control 254, play control 250, pause control 258 and stop control 256.

Software Overview

Figure 8:
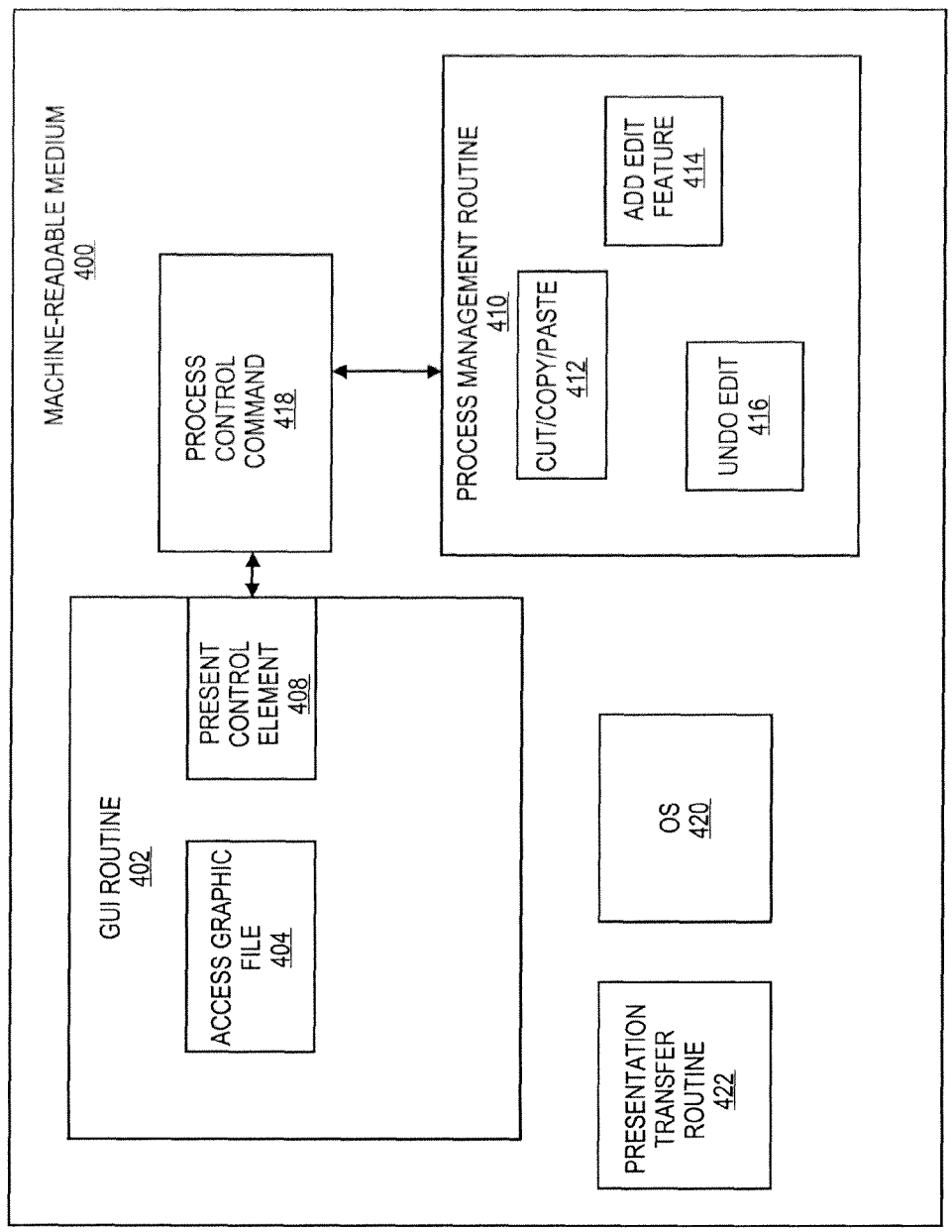
FIG. 8 is a block diagram of a machine-readable medium storing executable code and/or other data to provide one or a combination of mechanisms for processing information, configured in accordance with one embodiment of the present invention.

Various software components, e.g. application program, may be provided within or in communication with the system that cause the processor to execute the numerous methods employed in creating the presentation. FIG. 8 is a block diagram of a machine-readable medium storing executable code and/or other data to provide one or a combination of operations, e.g. mechanisms for collecting and manipulating the time based stream of information, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, dynamic random access memory, static RAM, flash memory, etc. Various subroutines may also be provided. These subroutines may be parts of main routines or added as plug-ins or Active-X controls.

Figure 7B:
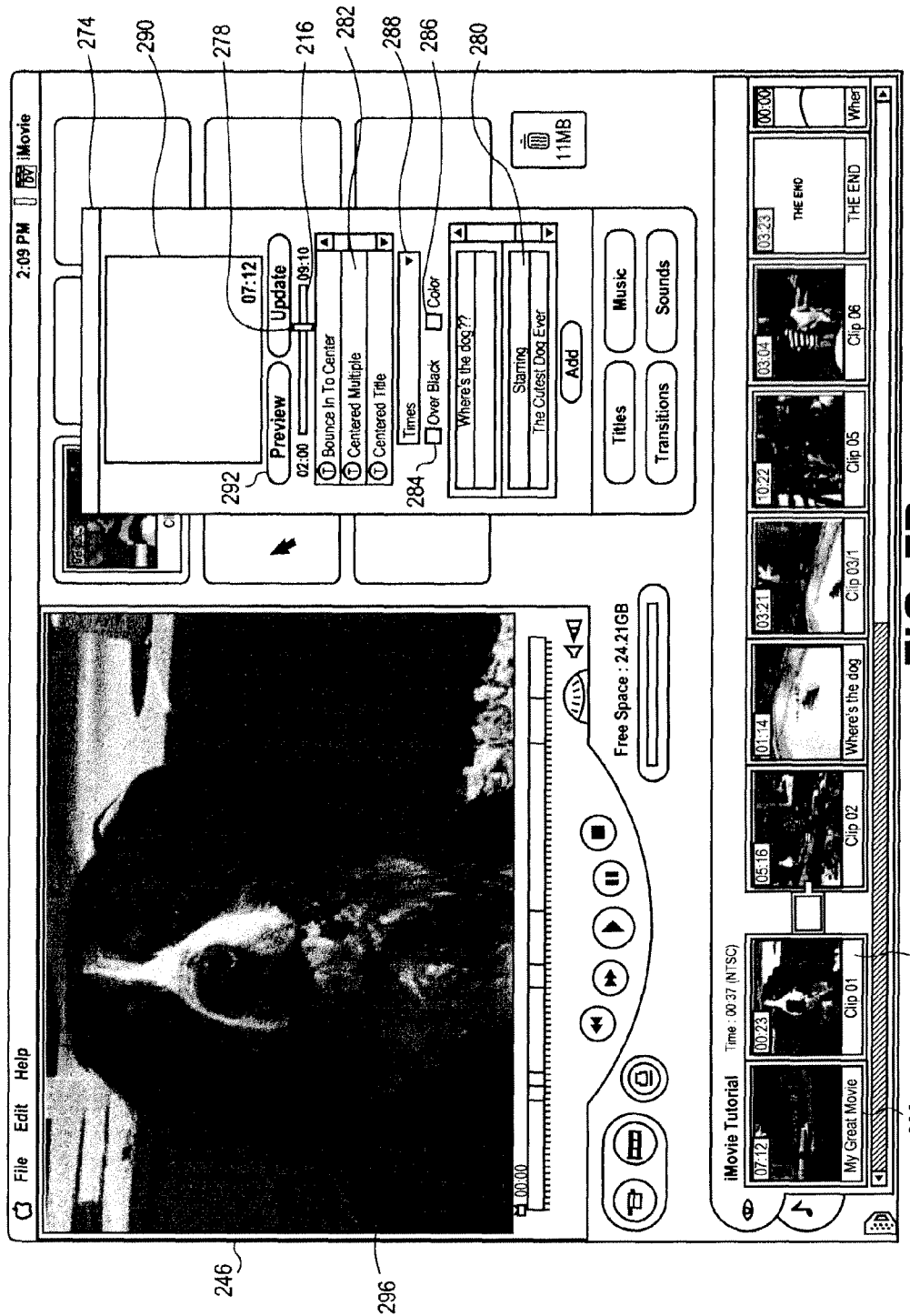

The machine readable storage medium 400 is shown storing a GUI routine 402, which, when executed, provides a layered GUI for display of control elements, such as the GUI 230 that may be used in an editing processing system shown in FIGS. 7A-7C. The GUI routine 402 includes a number of mechanisms for playing or otherwise displaying the time based stream of information. A subroutine for accessing a graphic file The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

A subroutine for accessing the graphic file 404 is provided, as described in regards to FIGS. 3 to 5. Usually the layers of the graphic file are read in hierarchical order. Furthermore, a present control elements subroutine 408 permits control elements to be visible on the display as determined by control objects in the graphic file. Another subroutine may be for launching an edit application program that displays the user interface and a further subroutine to manipulate the control objects for altering the control element attributes.

The medium 400 also has a process control command routine 418 that directs the carrying out of various commands, such as for manipulating information and constructing a presentation. The control commands may be generated by activation of control elements by the user. Upon receipt of the control commands, the process control command 418 may send instructions to the GUI Routine 402 to specify particular information to be presented or manner of presenting information. The process control command 418 routine may also send the commands to a process management routine, such as an add edit feature command, undo command, delete command, select information command, cancel delete command, and the like, as described below.

The medium also has a process management routine 410 that may have various subroutines for conducting various tasks related to editing and carrying out instructions from the process control command routine 418. One such subroutine is a cut/copy/paste subroutine 412, which when executed, references or portions thereof are cut, copied and/or pasted into a presentation. The process management routine 410 may be also configured for conducting an add edit feature subroutine 416 to include particular edit features to references for use in a presentation. An undo edit subroutine 414 may optionally be included whereby certain edit tasks may be undone to reclaim the unmodified version of data Other software components may include an operating system 420 and a presentation transfer routine 422 that facilitates communication of information from the processing system, such as via external player 84. Various modes of transfer are described above with reference to the external player 84 in FIG. 2.

The software components may be provided in as a series of computer readable instructions that may be embodied as data signals in a carrier wave. When the instructions are executed, they cause a processor, such as through a browser to perform the capture and editing steps as described. For example, the instructions may cause a processor to communicate with an information source, provide capture information from the time based stream of information on a first portion of a display, provide process information for constructing the presentation on a second portion of the display; and provide at least one enabled control element. Such instructions may be presented to the processor by various mechanisms, such as a plug-in, ActiveX control, through use of an applications service provided or a network, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described information transfer system as well as methods of its use without departing from the broad scope of the invention. Therefore, the following claims and their legal equivalents should determine the scope of the invention.

What is claimed is:

1. A method for producing a graphical user interface of an application program, the method comprising:
storing a graphic file created by a multi-layered type computer program, the graphic file containing a list of control objects, wherein each control object is in at least one layer, dictates at least one attribute of a control element, is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
creating an application program other than the multi-layered type computer program to access the graphic file and to display a control element from the graphic file on the graphical user interface of the application program, the control element having at least one attribute dictated by one of the control objects in the at least one layer of the graphic file.

2. The method of claim 1, wherein the at least one layer of the first control object is grouped with other layers in the graphic file.

3. The method of claim 1, wherein the control element is an edit control to manipulate a time-based stream of digital video information by moving a play-head along a course of frames of a clip of a digital video scene of interest.

4. The method of claim 1, wherein the at least one attribute is at least one of an appearance and location and size and element type and state and function and behavior in a particular environment.

5. The method of claim 1, wherein the at least one layer is linked with other layers.

6. The method of claim 1 further comprising the graphics file program displaying the control objects and allowing the control objects to be edited using the graphics file program to change the control element attribute as dictated by the editing of the control objects.

7. The method of claim 1 wherein the multi-layered type computer program comprises a graphics editor; and
the control object comprises a picture-related control object embodied in an image page and depicting a control element as the element would appear on the graphical user interface or comprises a textual description of an attribute of a control element listed on a layer list page; further comprising:
the graphics editor forwarding through, reversing through, and editing frames of a clip of digital video.

8. The method of claim 7 wherein the application program comprises a video editing program to edit video and movies having a time based stream of video information;
wherein the control objects may be edited by adding, deleting, or changing the control object to revise the control elements of the graphical user interface of the application program without converting the graphical user interface of the application program to an intermediate format or recompiling the graphical user interface of the application program; and
wherein the control elements have at least one of an appearance of an element, a location of an element, a size of an element, a type of a graphical user interface environment, a state of a graphical user interface environment, function of a graphical user interface environment or a behavior of a graphical user interface environment dictated by the control objects.

9. The method of claim 1 wherein editing a control object causes a control element to be edited.

10. The method of claim 1, wherein the control objects may be edited by adding, deleting, or changing the control object to revise the control elements of the graphical user interface of the application program without converting the graphical user interface of the application program to an intermediate format or recompiling the graphical user interface of the application program.

11. The method of claim 1, wherein each of the layers has an order relative to the other layers in the series of transparent overlays.

12. A computer system comprising:
a storage;
a display device; and
a processor coupled to the display device and the storage for:
storing a graphic file created by a multi-layered type computer program, the graphic file containing a list of control objects, wherein each control object is in at least one layer, dictates at least one attribute of a control element, is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
creating an application program other than the multi-layered type computer program to access the graphic file and to display a control element from the graphic file on a graphical user interface of the application program, the control element having at least one attribute dictated by one of the control objects in the at least one layer of the graphic file.

13. The system of claim 12, wherein the at least one layer is grouped with other layers.

14. The system of claim 12, wherein the control element is an edit control to manipulate a time-based stream of digital video information by moving a play-head along a course of frames of a clip of a digital video scene of interest.

15. The system of claim 12, wherein the at least one attribute is at least one of an appearance and location and size and element type and state and function and behavior in a particular environment.

16. The computer system of claim 12, wherein the at least one layer is linked with other layers.

17. A processing system for producing a graphical user interface of an application program, comprising:
means for storing a graphic file created by a multi-layered type computer program, the graphic file containing a list of control objects, wherein each control object is in at least one layer, dictates at least one attribute of a control element, is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
means for creating an application program other than the multi-layered type computer program to access the graphic file and to display a control element from the graphic file on the graphical user interface of the application program, the control element having at least one attribute dictated by one of the control objects in the at least one layer of the graphic file.

18. The system of claim 17, wherein the at least one layer is grouped with other layers.

19. The system of claim 17, wherein the control element is an edit control to manipulate a time-based stream of digital video information by moving a play-head along a course of frames of a clip of a digital video scene of interest.

20. The system of claim 17, wherein the at least one attribute is at least one of an appearance and location and size and element type and state and function and behavior in a particular environment.

21. The system of claim 17, wherein the at least one layer is linked with other layers.

22. A machine-readable storage medium having stored executable instructions, which, when executed by a computer system for producing a graphical user interface of an application program, cause the computer system to:
store a graphic file created by a multi-layered type computer program, wherein each control object is in at least one layer, dictates at least one attribute of a control element, is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
create an application program other than the multi-layered type computer program to access the graphic file and to display a control element from the graphic file on the graphical user interface of the application program, the control element having at least one attribute dictated by one of the control objects in the at least one layer of the graphic file.

23. A machine-readable storage medium of claim 22, wherein the at least one layer is grouped with other layers.

24. A machine-readable storage medium of claim 22, wherein the control element is an edit control to manipulate a time-based stream of digital video information by moving a play-head along a course of frames of a clip of a digital video scene of interest.

25. A machine-readable storage medium of claim 22, wherein the at least one attribute is at least one of an appearance and location and size and element type and state and function and behavior in a particular environment.

26. The medium of claim 22, wherein the at least one layer is linked with other layers.

27. A method for producing a graphical user interface of an application program, the method comprising:
creating a graphic file containing a list of layers, wherein each layer dictates at least one attribute of a control element, wherein each layer is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program;
creating an application program to access the graphic file and to display a control element from the graphic file on the graphical user interface of the application program, the control element having at least one attribute dictated by one layer of the graphic file; and
storing the graphic file and the application program.

28. The method of claim 27 wherein the graphic file is created using a multi-layered type computer program other than the application program, and wherein each of the plurality of the control objects in the different layers is selected and changed without affecting any other layer of the layers on the user interface.

29. The method of claim 27 wherein the layers are grouped.

30. The method of claim 29, wherein allowing the control objects to be edited comprises allowing use of a graphics file program to independently change the control objects to cause the corresponding attribute of the control element to change.

31. The method of claim 27 wherein the layers are linked.

32. A processing system for producing a graphical user interface of an application program, comprising:

means for storing a graphic file containing a list of layers, wherein each layer dictates at least one attribute of a control element, wherein each layer is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
means for storing an application program to access the graphic file and to display a control element from the graphic file on the graphical user interface of the application program, the control element having at least one attribute dictated by one layer of the graphic file.

33. The system of claim 32 wherein the graphic file is created using a program other than the application program.

34. The system of claim 32 wherein the layers are grouped.

35. The system of claim 32 wherein the layers are linked.

36. A machine-readable storage medium having stored executable instructions, which, when executed by a computer system for producing a graphical user interface of an application program, cause the computer system to:
store a graphic file containing a list of layers, wherein each layer dictates at least one attribute of a control element, wherein each layer is editable by a user, and is independently editable relative to a different control object, wherein each of a plurality of the control objects is in a different layer, wherein each layer, when presented on a user interface used to create or edit the graphics file, appears as a series of transparent overlays of the layers on the user interface, and wherein each layer contains an image of the user interface of the application program; and
store an application program to access the graphic file and to display a control element from the graphic file on the graphical user interface of the application program, the control element having at least one attribute dictated by one layer of the graphic file.

37. The medium of claim 36 wherein the graphic file is created using a program other than the application program.

38. The medium of claim 36 wherein the layers are grouped.

39. The medium of claim 36 wherein the layers are linked.

* * * * *